J. OWINGS.
LIMEKILN.
8851X
Patented May 29, 1835.
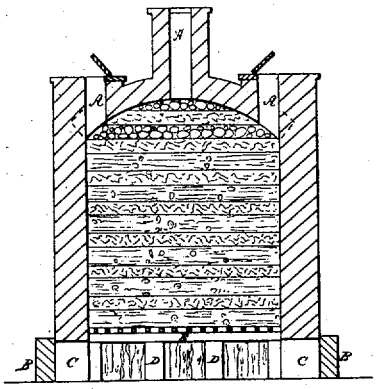
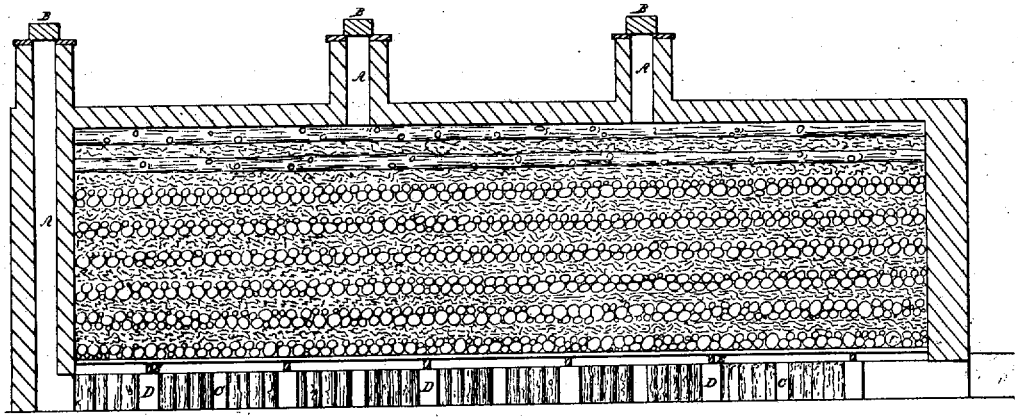
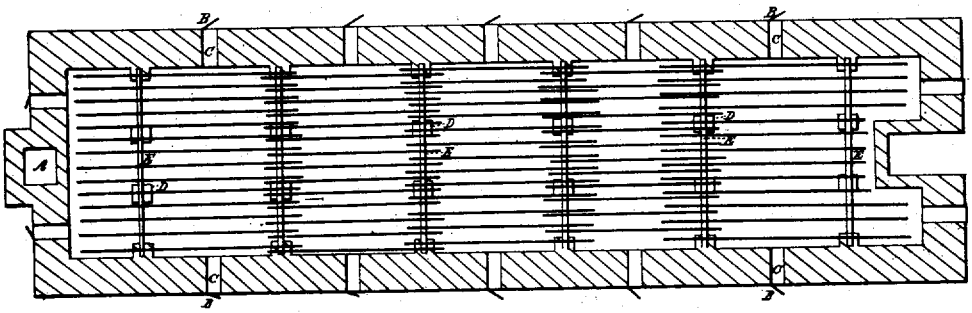

May 29 1835

John Owings
Letters Patent

8851X

The Schedule referred to in these Letters Patent and making part of the same containing a description in the words of the said John Owings himself of his improvement in Furnaces for burning Lime & Smelting Ore &c

---

To all to whom these Presents shall come

Be it known that John Owings now of Adams County in the State of Pennsylvania have made a new and valuable improvement in the mode of constructing furnaces for burning lime and smelting Ore &c and that the following is a full and exact description of the construction and operation of said furnace as invented or improved by me, By it heat is concentrated regulated increased and decreased so as to char wood into coal and burn lime at the same time by which process the charcoal will pay the expense of burning the lime the farmer will have it in his power to furnish his lands with lime with his waste wood and be paid for so doing the advantages which may result to the community at large from this discovery are innumerable. Amongst the principal of which are the saving of expense in the burning of brick tiles Delft &c. it would also be very advantageous to iron & brass founders, Manufacturers and builders all of whom would be interested by the low rates at which the valuable articles of lime and charcoal could be procured. It would also be advantageous to many to know how to govern and regulate heat to answer their purposes the public generally who use those articles in various ways would all be benefitted by their cheapness. The walls of the furnace are 45 feet in length, 10 feet in breadth in the clear in the inside. 10 feet high to the spring of the arch. The arch is started from each of the side walls and closed at the top forming a segment of a circle of about 8 feet high perpendicularly from its chord. the arch covers the whole furnace from the front to the back end there are three rows of chimnies built in it from front to back at equal distances to correspond with air holes left at the foundation

8851.X of the walls as will be seen by the plan, the chimnies (an air holes are
to regulate, increase or diminish the heat by opening (an shutting them
to regulate the druft of air, Although the dimensions are here laid
down as to size (an shape it is immaterial as it may be formed of any
size or shape to please the fancy or suit the convenience of the proprietor,
The main object of constructing it is to concentrate, regulate, increase,
or decrease the heat at pleasure (and with ease which can be done
by opening (an shutting the chimnies (an air holes to govern the draft)
the walls may be made of brick or stone, unburnt brick are cheap-
est (an the heat would burn them in the walls, the degree of heat
requisite to burn lime is a bright red near to a welding heat. This
I proved in a Smiths forge where I burned lime. This furnace acts
in three different capacities first as a coal pit seconly as a lime kiln
(and thirdly (and properly as an air furnace all at the same time, hav-
ing a complete druft of air through it in the space left in the bottom
of the furnace from the ground to the top of the pillars on which the bars
are placed to lay the wood and lime stone, on this space is about two
feet from the ground to the bars over the whole space of the inside of the
walls, this is filled with short wood placed on the ends perpendicular-
ly leaving a space in the centre from the mouth to the large end chim-
ney of 18 inches or 2 feet to be filled with dry wood to set it on fire, the
fire may also be dropt in at the top of the chimnies in order to ignite it all
at once, There are two rows of pillars 2 feet high about 9 inches square
about 3 feet apart from side to side of the walls with small projec-
tions left on the side walls to rest the ends of the larger bars on that are
laid on the tops of the pillars to support the light bars that are laid
across the large bars parallel to the side walls of the furnace to lay the
wood (an lime stone on the bottom part of the furnace being filled with
wood (an all regulated as above described. the wood is then laid on
the bars all over the inside of the furnace about 12 inches thick then
a layer of lime stone 6 or 8 inches thick then another layer of wood (an
then lime stone as above described laying it alternately till the
whole space is filled to the square of the walls, the wood (and stones are

8851X then laid rounding so as to form a bearing to build the arch on, dry
wood should be placed on the bearing under the chimnies so as to be
easily ignited at the same time the light wood is ignited in the cen
of the furnace ^The furnace^ now being filled with wood and lime stone the arched
ed and the chimnies all finished with covers to open and shut the
chimnies and air holes the whole is ignited until it is perfectly char
ed if it should then be doubted whether the lime stone had a sufficie
cy of heat it may be tried by pushing a bar of iron into the chimnies o
air holes the degree of heat which burns lime being a bright red near t
a welding heat, this is correctly proved by the bar of iron heated in.
if it should be found to require more heat the whole quantity of woo
in the furnace being then ignited and chared surrounding the lime ston
on every part a draft of air is then admitted in the mouth of the furna
which passing through the centre of that mass of fire to the large chimne
at the back will produce a degree of heat to any height you wish
stronger and sooner than any furnace built in the ordinary way as is ev
ident to any one who is in the least acquainted with air furnaces. the
degree of heat is known by the quantity of fuel consumed and the pow
of the draft of air admitted in them, when you find the heat sufficie
ly strong and the lime compleatly burned stop the draft of air by shutting th
mouth of the furnace and cover the chimney, the fire will then be smoth
ered, as in a coal pit and when cooled the lime and coal are fit for use.
All smelters of ores such as iron, copper or lead must at once see their pro
in this kind of furnace as the expense of making charcoal would be in a
great measure saved as well as the waste of heat in making it, the woo
and ore would be laid in the furnace in the same way that the wood and
lime stone are laid until it is filled it is then covered the end walls b
ing raised so as to close with the arch The chimnies as before described th
only difference in the furnace would be the space left to be filled with
short wood from the top of the pillars to the ground would be formed
in a curve inclining to the middle from the side walls of the furnace
also inclining a little from the back to the front, the use of said curv
is to receive the metal when melted and by its elevation at the bac to draw the metal to the front where there is a place formed for it to lodge in in order to convey it to the moulds where it is formed the air holes to be formed between the side walls (and the curve as represented in the end view of the furnace, the heat is managed nearly in the same manner as in burning lime (and coal with this difference the one will require a stronger and more intense heat which is given to it when the wood is chared and the ore heated (and surrounded by a mass of fire the draft of air is then admitted and increased until the ore is melted (and in a brilliant liquid state the draft of air is then stopped in order to save the coal not then consumed. Now I do not claim as my invention the use of alternate layers of lime stone or ore and fuel in burning or smelting operations nor of a multiplicity of vents or air holes used in connection with a principal vent; these having been separately used for the purposes herein described. But what I do claim as new and as my invention is the use of a raised floor or grating whereon to rest the stone or ore and fuel, in combination with the vents as herein set forth by which the heat of the kiln or furnace is rendered perfectly manageable (and the balance of the fuel after the operation of burning or smelting is completed; is converted into charcoal or coke when wood or bituminous coal is used. In testimony that the foregoing is a true specification of my said improvement I have hereunto set my hand at Washington this 12th day of May 1835.

John Owings

Tesd. Witnesses
W.G.C. B.K. Morsell
Wm Walls (Drawing)

(Patented 29th May 1835)